Figure 1:
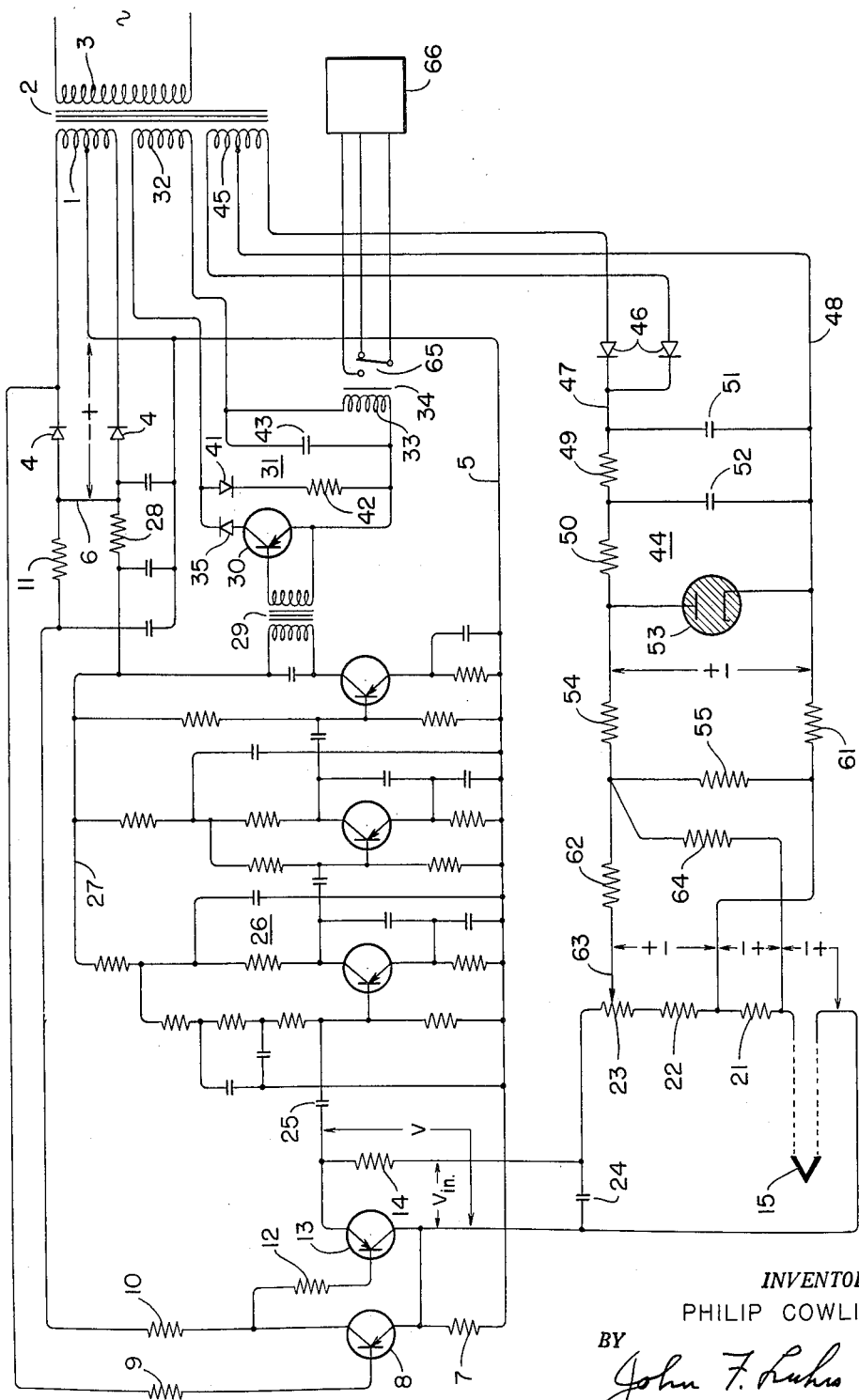

INVENTOR.
PHILIP COWLIN

Jan. 29, 1963   P. COWLIN   3,076,100
MEANS FOR COMPENSATING A TRANSISTORIZED INVERTER
FOR AMBIENT TEMPERATURE CHANGES
Filed July 21, 1958   2 Sheets-Sheet 2

INVENTOR.
PHILIP COWLIN
BY
John F. Luhrs
ATTORNEY

United States Patent Office 3,076,100
Patented Jan. 29, 1963

3,076,100
MEANS FOR COMPENSATING A TRANSISTORIZED INVERTER FOR AMBIENT TEMPERATURE CHANGES
Philip Cowlin, Croydon, England, assignor to Bailey Meter Company, Cleveland, Ohio, a corporation of Delaware
Filed July 21, 1958, Ser. No. 749,825
7 Claims. (Cl. 307—44)

This invention relates to electrical indicating or/and control systems, in particular, to such systems in which a variable D.C. signal from a measuring device is, in order to avoid the difficulties associated with the use of D.C. amplifiers, converted to a corresponding square wave signal, which is capable of amplification by known techniques, and which is arranged to operate appropriate means for indicating or/and controlling, which may include, for example, relay means adapted to have one state when the amplitude of the square wave signal is above a predetermined value and in a given phase, and another state when the amplitude of the square wave signal is below the predetermined value and in the same phase, or has a value in the opposite phase.

The conversion of the D.C. signal to a square wave signal has been effected by mechanical vibrators, but such vibrators tend to be delicate and subject to various ageing and fatigue effects. It has been proposed to employ in place of a mechanical vibrator a switch having no moving parts in the form of a triode junction transistor electrically operated alternately to open and to close the circuit of the D.C. signal from the measuring device, the circuit of the D.C. signal passing through the transistor between the collector and emitter. It is known, however, that changes in the temperature at which a transistor is operated are accompanied by considerable changes in the characteristics of the transistor. Therefore in a system employing a transistor as switching means it may be expected that the relay will tend to operate at various values of the D.C. signal from the measuring device other than the desired value and so at undesired values of the condition or quantity measured unless the temperature of the transistor is rigidly regulated.

The present invention includes an electrical indicating or/and control system adapted to operate in dependence upon a variable D.C. signal from a measuring device, comprising a converter arranged by means of a triode junction transistor electrically operated as switching means in the circuit of the D.C. signal to generate a square wave output of amplitude dependent upon the value of the D.C. signal and relay means for effecting indication or/and control adapted to have one state when the amplitude of the square wave signal is above a predetermined value and in a given phase, and another state when the amplitude of the square wave signal is below the predetermined value and in the same phase, or has a value in the opposite phase, wherein the D.C. signal is arranged to bear a selected relation to the condition or quantity measured and there is included in its circuit a resistance of selected value, the relation being selected with respect to the value of said resistance, to the values of the temperature differential coefficients of the transistor equivalent voltage source and the transistor equivalent current source, and to the values of the transistor equivalent shunt resistance and the temperature differential coefficient thereof, so that the amplitude of the square wave output is substantially independent of transistor temperature, over a substantial temperature range, when the condition or quantity measured is at a predetermined desired value.

The transistor may be of p-n-p or of n-p-n kind.

Figure 2:
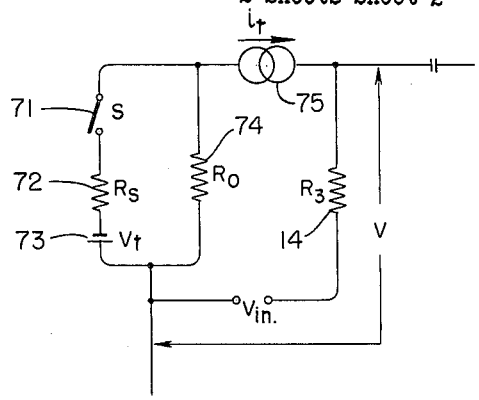
Figure 3:
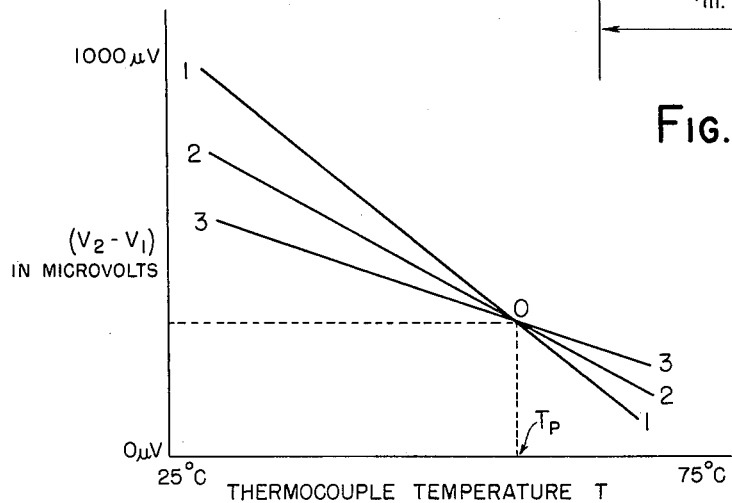
Figures 4, 5:
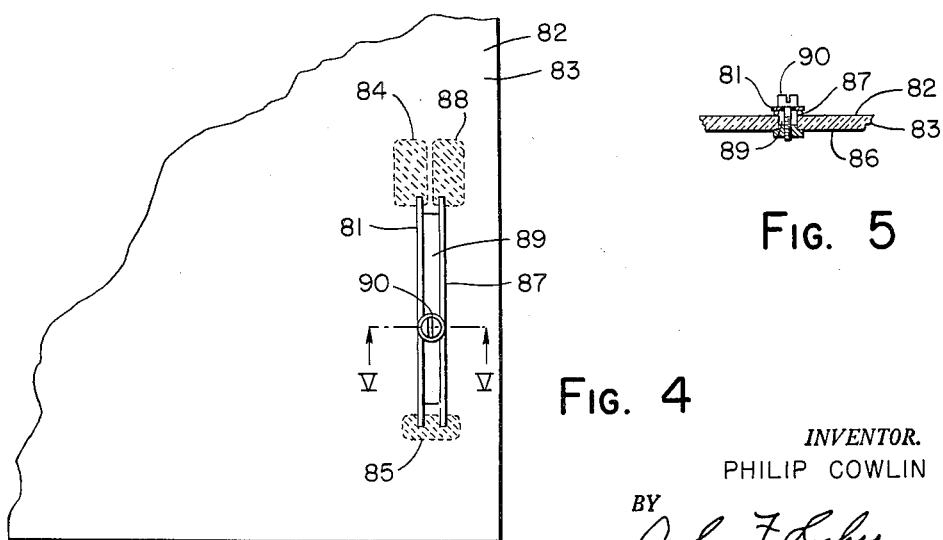

The invention will now be described, by way of example, with reference to the accompanying drawings, in which FIGURE 1 is a circuit diagram of apparatus in which relay means is to be given one state or another state according as a measured temperature is above or below a predetermined value, FIGURE 2 presents part of the diagram of FIGURE 1 with a transistor replaced by its equivalent circuit, FIGURE 3 shows graphic curves, and FIGURES 4 and 5 show the mounting of a resistance of small value on the plate of a printed circuit and means by which its resistive value in its circuit may be adjusted, FIGURE 5 being a view in section on the line V—V of FIGURE 4.

Referring to FIGURE 1 of the drawings, a secondary winding 1 of a transformer 2 of which the primary winding 3 is energized by alternating current of 50 cycles per second establishes with the aid of a pair of rectifiers 4 a direct current potential difference between a conductor 5 (positive) connected to the midpoint of the secondary winding 1 and a conductor 6 (negative).

The positive conductor 5 is connected through a resistance 7 to the emitter of a p-n-p transistor; the base of the transistor 8 is connected through a resistance 9 to one end of the secondary winding 1, and the collector of the transistor 8 is connected through a resistance 10 and, in series therewith, a resistance 11 to the negative conductor 6. The collector of the transistor 8 is connected through a resistance 12 to the base of a p-n-p transistor 13, of which the collector is connected to the emitter of the transistor 8.

The emitter and collector of the transistor 13 are connected in the circuit of a D.C. input signal $v_{in}$ in which circuit there is also included a resistance. The D.C. input signal consists of the difference between a D.C. voltage from a thermocouple 15, to which is added a D.C. voltage established across a resistance 21, and a D.C. voltage established across a resistance 22 and part of a resistance 23. The circuit of the D.C. input signal leads from the collector of the transistor 13 in series through the thermocouple 15 and the resistances 21, 22, 23 and 14 to the emitter of the transistor 13. A condenser 24 is connected across the part of the circuit comprising the thermocouple and the resistances 21, 22 and 23.

A connection leads from the emitter of the transistor 13 through a condenser to a three-stage R=C coupled stabilized transistor amplifier 26 which is energized through the positive conductor 5 and through a negative conductor 27 connected to the negative conductor 6 through a resistance 28. The output from the amplifier 26 is applied through a transformer 29 between the base and the emitter of a transistor 30 in a relay control circuit 31. The relay control circuit 31 is energized by a further secondary winding 32 of the transformer 2.

In the relay control circuit 31 one end of the secondary winding 32 is connected to the emitter of the transistor 30 through the coil 33 of a relay 34 and the other end of the secondary winding 32 is connected to the collector of the transistor 30 through a rectifier 35 arranged in the sense to prevent the flow of current through the transistor in the correct direction. A rectifier 41 in series with a resistance 42 is connected in shunt across the transistor 30 and the rectifier 35 to provide an alternative path of relatively high resistance for such current. A smoothing condenser 43 is connected across relay coil 33.

The D.C. voltages to be established across resistances in the D.C. input signal circuit are provided by a circuit 44 which is energized by a further secondary winding 45 of the transformer 2. The ends of the secondary winding 45 are connected to a pair of rectifiers 46 arranged in the sense to generate in a conductor 47 a D.C. positive potential with respect to a conductor 48 connected to the midpoint of the secondary winding 45. The D.C. voltage established between the conductors 47 and 48 is smoothed by an arrangement of series resistances 49 and 50 and shunt condensers 51 and 52 and limited by a gas-filled thermionic diode 53, and passes a direct current through resistances 54, 55 and 61, of which the first and last drop the voltage so that a stabilized potential difference of the order of 1 volt exists across the resistance 55.

The negative end of the resistance 55 is joined to the input signal circuit at a point between the resistances 21 and 22 and the positive end of the resistance 55 is joined to the said circuit through a resistance 62 and a slide 63 adjustable in position along the resistance 23. By this means a D.C. voltage of adjustable value, and of low order, for example, 40 millivolts, may be established in the said circuit across the resistance 22 and part of the resistance 23, this voltage being in the sense of making the emitter of the transistor 13 positive with respect to the collector thereof.

The positive end of the resistance 55 is joined to the input signal circuit also through a resistance 64 to a point in the said circuit between the thermocouple 15 and the resistance 21. By this means a D.C. voltage of low order, for example, 10 millivolts, may be established in the said circuit across the resistance 21. The sense of this voltage is opposed to that established across the resistance 22 and part of the resistance 23, and in the same sense as that yielded by the thermocouple under operating conditions. The resistance 21 is of copper and it is subjected to the same temperature as the thermocouple cold junction and the arrangement is such that if the said cold junction temperature varies the change in the voltage across the resistance 21 due to the change in its resistance value is the same and in the opposite sense as the change in the thermocouple yield; thus the voltage across the thermocouple together with that across the resistance 21 depends only upon the temperature of the thermocouple hot junction. The said voltage across the thermocouple together with that across the resistance 21 is in magnitude less than that across the resistance 22 and part of the resistance 23.

In the operation of the arrangement, one half of the secondary winding 1 applies between the base and the emitter of the transistor 8 a sinusoidal voltage input which causes the said transistor to pass intermittent pulses of current. At the end of each current pulse the base of the transistor 13, which is connected to the collector of the transistor 8 through the resistance 12, rapidly falls in potential, whereby the transistor 13 becomes enabled to conduct; at the beginning of each current pulse the base of the transistor 13 conversely rapidly rises in potential, whereby the transistor 13 becomes unable to conduct. The transistor 13 is thus caused to operate as alternately operated switching means in the circuit of the D.C. input signal $v_{in}$.

The instantaneous potential of the emitter of the transistor 13 relative to the positive conductor 5 depends upon the voltage drop in the resistance 7 and the output from the D.C. input signal circuit. When the transistor 8 is non-conductive and the transistor 13 is conductive, the voltage drop in the resistance 7 is low, and also the output from the D.C. input signal circuit is low. When the transistor 8 is conductive and the transistor 13 is non-conductive, an increased voltage drop is provided by the resistance 7 and also the output from the D.C. input signal circuit is relatively high. The amplifier 26, connected to the emitter of the transistor 13, receives a square wave input of amplitude corresponding to the change of emitter potential between one of these states and the other, and generates therefrom an amplified square wave signal which is applied between the base and emitter of the transistor 30 in the relay control circuit 31.

The contacts 65 of the relay 34 control the circuit of a device 66, which may be an audible warning device or/and a visual indicating or/and warning device or/and an appropriate control device. The state assumed by the contacts 65 of the relay 34 depends upon the biassing of said contacts and upon the value of the current in the relay coil 33 which latter depends upon the amplitude of the square wave signal applied between the base and the emitter of the transistor 30 in the relay control circuit 31; the amplitude of the square wave signal depends upon the thermocouple hot junction temperature, the characteristics of the transistor 13, and the amount of the potential drop in the resistance 7.

The characteristics of the transistor 13 change with the temperature at which it is operated but in the present arrangement it is nevertheless devised that the amplitude of the square wave signal does not depend upon the temperature of the transistor over a substantial and useful range whenever the thermocouple hot junction is at a predetermined temperature at which it is required that the relay contacts 65 shall operate. Reference should be made to FIGURE 2, in which part of the circuit of FIGURE 1 is reproduced with, however, the transistor 13 replaced by its equivalent circuit, which consists of a switch S (reference numeral 71), a series resistance $R_s$ (reference numeral 72) and a voltage source $v_t$ (reference numeral 73) in series, all shunted by a shunt resistance $R_o$ (reference numeral 74) and a current source $i_t$ (reference numeral 75).

The value of the resistance $R_3$ (reference numeral 14) is chosen so as to be small compared with the input impedance of the amplifier 26 and large compared with the equivalent series resistance $R_s$ of the transistor 13.

When the transistor 13 acts as a closed switch, then the instantaneous value $v_1$ of the voltage $v$ across the collector and emitter can be shown to be nearly equal to the transistor equivalent voltage source $v_t$.

When the transistor 13 acts as an open switch, the instantaneous value $v_2$ of the voltage $v$ across the collector and emitter is $$v_2 = \frac{R_o}{R_o + R_3} v_{in} + i_t R_3 \tag{1}$$

The square wave amplitude passed to the amplifier 26, other than the component thereof due to the potential drop in the resistance 7, is equal to $(v_2 - v_1)$, of which the rate of change with temperature $\theta$ of the transistor 13 is given by $$\frac{d(v_2 - v_1)}{d\theta} = \frac{R_3}{(R_o + R_3)^2} \frac{dR_o}{d\theta} v_{in} + R_3 \frac{di_t}{d\theta} - \frac{dv_t}{d\theta} \tag{2}$$

In all transistors suitable for the present purpose the temperature differential coefficient $$\frac{dR_o}{d\theta}$$

of the transistor equivalent shunt resistance $R_o$ is negative, while the temperature differential coefficient $$\frac{di_t}{d\theta}$$

of the transistor equivalent current source $i_t$ is positive. Before selecting and assembling the components of the arrangement of FIGURE 1, the values of the said differential coefficients relating to the transistor 13 to be used are determined, and also the value of the temperature differential coefficient $$\frac{dv_t}{d\theta}$$

of the transistor equivalent voltage source $v_t$ which coefficient may be found to have a positive or a negative value depending upon the type of transistor used; these coefficients are determined for the temperature range over which the transistor temperature is likely to vary.

Then the value that $v_{in}$ should have to make the first two terms (positive and negative respectively) in the right-hand side of the Equation 2 balance the third term in the right-hand side of the equation is calculated; the slide 63 is then adjusted in position along the resistance 23 so that when the thermocouple hot junction is at the predetermined temperature at which the relay contacts 65 are to be operated, the D.C. input voltage $v_{in}$ has the calculated value, which ensures that the left-hand side of the equation becomes zero, that is to say, the output from the transistor 13 is invariant with temperature $\theta$.

In FIGURE 3, the quantity $(v_2-v_1)$ is plotted against the thermocouple hot junction temperature T for different values of the transistor temperature $\theta$ when the slide 63 is so positioned that $v_{in}$ assumes the calculated value when the thermocouple is subject to the predetermined temperature $T_P$. The curves 101, 202 and 303 correspond to transistor temperatures $\theta_1$, $\theta_2$ and $\theta_3$ respectively. It will be seen that when the thermocouple temperature is $T_P$, the quantity $(v_2-v_1)$ has a value independent of the transistor temperature, since the curves intersect at one point, where $T=T_P$. It is immaterial that at thermocouple temperatures different from the predetermined value the quantity $(v_2-v_1)$ varies according to the transistor temperature $\theta$.

When the thermocouple hot junction has the predetermined temperature and consequently the D.C. input voltage $v_{in}$ has the calculated value, the quantity $(v_2-v_1)$, i.e. the square wave amplitude passed to the amplifier 26 other than the component thereof due to the potential drop in the resistance 7, is determined. The resistance 7 is adjusted in value so that with this determined value of $(v_2-v_1)$ the square wave input to the amplifier 26 has an amplitude such that the corresponding current in the relay winding 33 has a value in the operative range of the relay 34.

If it is known that the proportion of the circuit elements are such that a particular value of the resistance 7 within a range of values provided and a particular position of the slide 63 on the resistance 23 can, in principle, be found so as to bring the circuit into an adjusted condition such that, irrespectively of the temperature of the transistor 13, the relay will operate when the thermocouple temperature has a predetermined value, the appropriate value for the resistance 7 and the appropriate position for the slide 63 on the resistance 23 may, if desired, be found as a result of experimenting on the effect of varying the value of the said resistance, the position of the slide 63 on the resistance 23 and the temperature of the transistor 13.

The maximum value required for the resistance 7 may be only a few hundred milli-ohms and FIGURES 4 and 5 show preferred means constituting said resistance when it is to be provided in connection with a printed circuit. Referring to these figures, a length of wire 81 of Eureka metal extends along one face 82 of the plate 83 on which the printed circuit components are mounted and extends at its ends through bores in said plates to respective copper deposits 84 and 85 on the other face 86 of the plate. A similar length of wire 87 of Eureka metal extends along the face 82 parallel to the wire length 81, extends at one end through a bore in the plate to the copper deposit 85, and at its other end extends through a bore in the plate to a copper deposit 88 on the face 86 of the plate adjacent to the deposit 84. The plate is formed with a slot 89 between the wire lengths 81 and 87, through which extends the clamping screw of a slide 90 adapted to bridge the wire lengths electrically at the adjustable position along the slot at which it may be clamped. The electrical resistance of the conductive path from the deposit 84 along part of the length of the wire 81 to the slide 90 and from the slide 90 along part of the length of the wire 87 to the deposit 88 constitutes the resistance 7, and is variable by adjustment of the position of the slide along the slot.

Preferably the transistor 13 is of the type known as the Mullard R.F. junction transistor OC45. It will be observed that the connection of the transistor 13 with the transistor 8, by means of which square wave switching signals are applied to the transistor 13, may be termed an inverted connection, seeing that the switching signals are applied between the collector and the base of the transistor 13, also that although the system operates at a low frequency the transistor 13 of the type mentioned is nevertheless one designed for use in high frequency circuits; the Mullard transistor OC45 has the property of permitting only low leakage currents between collector and emitter with the base not connected. The characteristics of such a transistor employed in inverted connection as switching means change extremely little with temperature.

I claim:

1. In a transistorized inverter for inverting a D.C.-potential into a pulsating signal having a amplitude corresponding to the magnitude of the D.C.-potential, comprising in combination, a D.C.-potential source, a triode junction transistor having an emitter, a collector and a base, a circuit connecting the D.C.-potential source across the emitter and collector, means for oscillating the potential of said base whereby said circuit is alternately opened and closed to thereby produce the pulsating signal and means for modifying the D.C.-potential of said source to render the amplitude of said pulsating signal independent of temperature changes of the transistor.

2. In a transistorized inverter for inverting a D.-C. potential into a pulsating signal having an amplitude corresponding to the magnitude of the D.-C. potential, comprising in combination, a source of D.-C. potential, a triode junction transistor having an emitter, a collector and a base, a circuit connecting the D.-C. potential source across the emitter and collector, means for oscillating the potential of said base whereby said circuit is alternately opened and closed to thereby produce the pulsating signal, and means for rendering the amplitude of the signal independent of the ambient temperature of the transistor including an impedance connected in said circuit and a second source of D.-C. potential connected across said impedance.

3. A system as claimed in claim 2 wherein the impedance is an adjustable impedance.

4. The system as claimed in claim 3 wherein the impedance comprises a resistance.

5. A system as claimed in claim 2 wherein the second source of D.-C. potential is a regulated source of D.-C. potential.

6. In a transistorized inverter for inverting the D.-C. potential produced by a thermocouple into a pulsating signal having an amplitude corresponding to the magnitude of the D.-C. potential, comprising in combination, a thermocouple for producing a D.-C. potential, a first triode junction transistor having an emitter, a collector and a base, a first circuit connecting the thermocouple across the emitter and collector, a second triode junction transistor having an emitter, a collector and a base, a source of alternating current, a transformer having a primary winding connected to said source of alternating current and a secondary winding provided with a center tap and a tap on either end, a diode rectifier connected to each of the end taps arranged to pass current toward its respective end tap, a second circuit connecting the center tap to the emitter of said second transistor, the collector of said second transistor to each of said rectifiers, and the base of said second transistor to one of said end taps; whereby the base of said second transistor is alternately positive and negative to alternately render said second transistor non-conducting and conducting, and a connection from said second circuit to the base of said first transistor whereby the first transistor is alternately rendered conducting and non-conducting to alternately open and close said first circuit to thereby produce a pulsating signal corresponding in magnitude to the magnitude of the D.-C. potential produced by said thermocouple.

7. A system as claimed in claim 6 including an impedance in said second circuit and a connection between the first and second circuits for modifying the amplitude of the pulsating signals.

References Cited in the file of this patent

UNITED STATES PATENTS

| | | |
|---|---|---|
| 2,607,911 | Hartung | Aug. 19, 1952 |
| 2,798,160 | Bruck et al. | July 2, 1957 |
| 2,802,071 | Lin | Aug. 6, 1957 |
| 2,807,758 | Pinckaers | Sept. 24, 1957 |
| 2,808,471 | Poucel et al. | Oct. 1, 1957 |
| 2,828,450 | Pinckaers | Mar. 25, 1958 |
| 2,849,614 | Royer et al. | Aug. 26, 1958 |
| 2,852,702 | Pinckaers | Sept. 16, 1958 |
| 2,864,978 | Frank | Dec. 16, 1958 |
| 2,888,627 | Kompelien et al. | May 26, 1959 |
| 2,942,148 | Fathauer et al. | June 21, 1960 |
| 2,956,179 | Yragul | Oct. 11, 1960 |
| 2,964,655 | Mann | Dec. 13, 1960 |

OTHER REFERENCES

"Designing Reliable Transistor Circuits," by Norman B. Saunders, published by Electronic Design (April 1955); pages 36–39 relied on.

UNITED STATES PATENT OFFICE
CERTIFICATE OF CORRECTION

January 29, 1963

Patent No. 3,076,100

Philip Cowlin

It is hereby certified that error appears in the above numbered patent requiring correction and that the said Letters Patent should read as corrected below.

Column 2, line 24, after "transistor" insert -- 8 --; line 35, after "resistance" insert -- 14 --; line 47, for "condenser to a three-stage R=C" read -- condenser 25 to a three-stage R-C --; same column 2, line 62, for "correct" read -- incorrect --.

Signed and sealed this 5th day of November 1963.

(SEAL)
Attest:

ERNEST W. SWIDER
Attesting Officer

EDWIN L. REYNOLDS

Acting Commissioner of Patents